H. L. HOARD.
MASSAGE APPLIANCE.
APPLICATION FILED OCT. 22, 1917.
1,265,083.
Patented May 7, 1918.
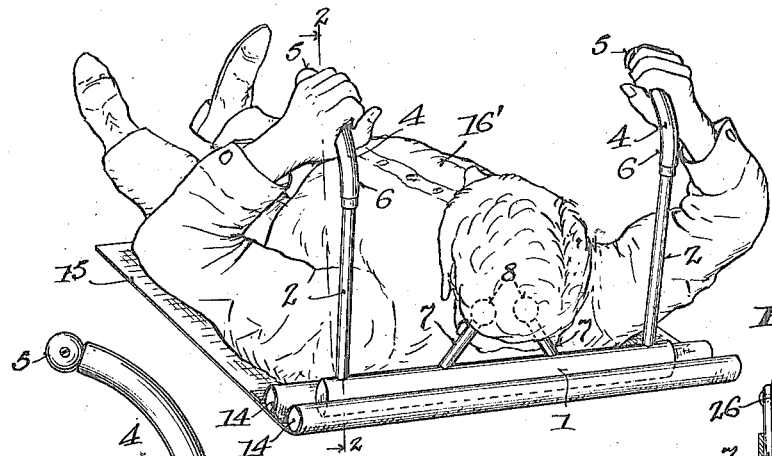
Fig. 1.
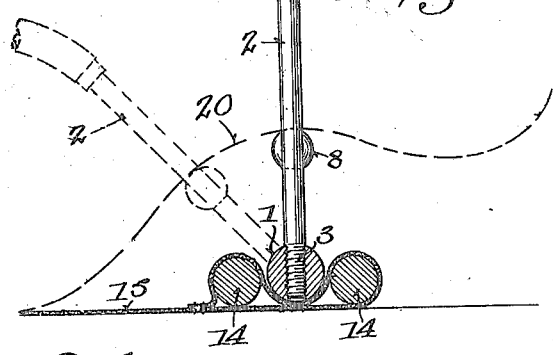
Fig. 2.
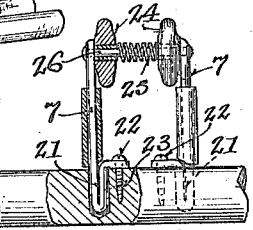
Fig. 7.
Fig. 5.
Fig. 4.
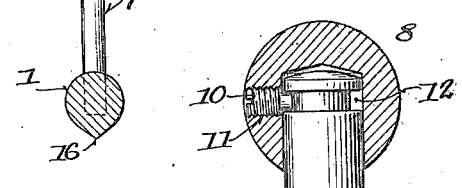
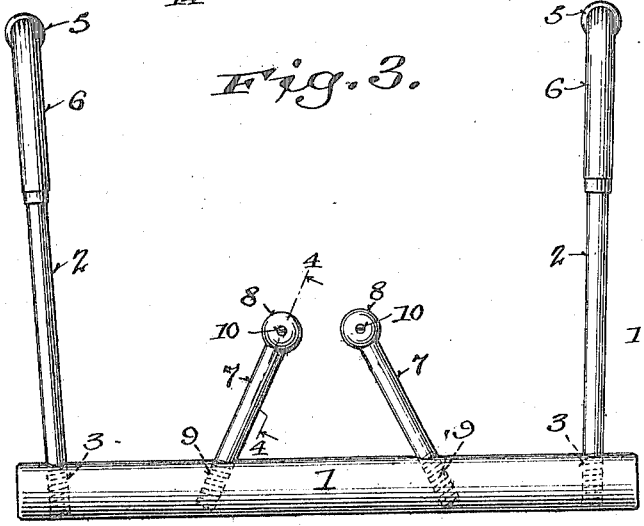
Fig. 3.
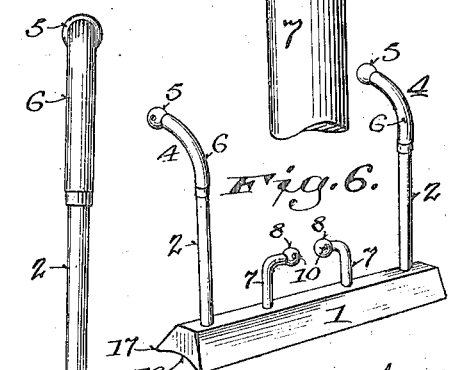
Fig. 6.
Inventor
Halbert L. Hoard
By Erwin Wheeler
Attorneys

UNITED STATES PATENT OFFICE.

HALBERT L. HOARD, OF FORT ATKINSON, WISCONSIN.

MASSAGE APPLIANCE.

1,265,083.  Specification of Letters Patent.  Patented May 7, 1918.

Application filed October 22, 1917. Serial No. 197,833.

*To all whom it may concern:*

Be it known that I, HALBERT L. HOARD, a citizen of the United States, residing at Fort Atkinson, county of Jefferson, and State of Wisconsin, have invented new and useful Improvements in Massage Appliances, of which the following is a specification.

My invention relates to improvements in so-called massage machines or devices, and the same is explained by reference to the accompanying drawings, in which—

Figure 1 represents a perspective view of the device as it appears when in use.

Fig. 2 is an end view thereof, drawn on line 2—2 of Fig. 1.

Fig. 3 is a front view.

Fig. 4 is an enlarged view, drawn on line 4—4 of Fig. 3.

Figs. 5, 6 and 7 are modified forms of the device.

Like parts are identified by the same reference characters throughout the several views.

My device comprises a bar 1, operating handles 2, 2, which are respectively rigidly secured to the bar 1. The outer ends of the handles 2 preferably curve at 4, 4, as shown in Figs. 1, 2 and 6, and their extreme outer ends are provided with balls 5, 5. Said handles are preferably provided with a non-metallic material. The center of said bar 1 is provided with two angular members 7, 7, which members curve inwardly. The outer ends of said members 7 are provided with balls 8, 8, while the inner ends of said members 7 are each provided with bearings 9, 9, by which they are rigidly secured to said bar 1. The balls 8 are preferably revolubly secured to the outer ends of the members 7 by set screws 10, which screws have screw threaded bearings 11 formed in said balls, while the inner ends of said screws 10 terminate in a groove 12, which groove is formed in said members 7.

It will be obvious that if said screws 10 bear but loosely in said groove 12 said balls 8, 8 will be free to revolve on said members, while said screws 10 serve to prevent said balls from being removed. When, however, said screws 10 are turned forwardly sufficiently in said grooves the inner ends of said screws will impinge against said members 7, and thereby prevent said balls from turning.

The members 7 are preferably placed at an acute angle to said bar 1 when the device is made as shown in Fig. 3. When, however, said bar 1 is formed as shown in Fig. 6, said members 7 are preferably secured to said bar 1 at right angles thereto, while their ends terminate inwardly or toward each other.

By the modified form in Fig. 7 the members 7 are preferably made flat on two opposing sides and their lower or attached ends are bent upwardly or doubled back upon themselves, when they are secured in the sockets 21 by the screws 22, which screws pass down through the apertures 23 terminating at their lower ends in said bar 1. 25 is a spiral spring which holds the rollers 24 apart.

Experience has demonstrated the fact that when said bar 1 is made round, as shown in Figs. 1, 2, 3 and 7, said bar 1 is likely to move forwardly or backwardly on a bed or other surface. In view of such fact said bar 1 is preferably provided with a V shaped projection 16, as shown in Fig. 5, or two projections 17, 17 as shown in Fig. 6, whereby such bar 1 is prevented from sliding as it might otherwise do if supported upon a smooth surface. The projections 17, 17 are formed in the bar 1 by providing said bar with a concave surface 18, whereby the edges 17, 17 are adapted, when a downward pressure is applied to said bar to engage in the supporting surface, and prevent such bar from sliding forwardly or rearwardly as the handles 2, 2 are inclined forwardly and backwardly.

Attention is called to the fact that when the balls 8 are revolubly supported from the members 7, as shown in Fig. 6, they are free to move forwardly and backwardly against the head, neck or back of the user, as the retaining groove 12 will in such case be brought at right angles to the line of movement of said balls.

It will be understood that when the device is used as shown in Fig. 1 the head, neck and spine of the user will rest upon the upper surface of the balls 8, 8, or rollers 24, 24, while the handles 2, 2 are moved forwardly and rearwardly. In the device shown in Fig. 1, the bar 1 is preferably supported upon the sheet 15 by and between the rollers 14, 14, while said sheet is held in place by the weight of the operator 16', whereby said device is held in its proper position as said handles are being moved forwardly and rearwardly by the user. By thus moving the handles 2 forwardly and rearwardly the balls 8, 8 or rollers 24, 24 are caused to move from the head downwardly along the neck and spine of the user, as indicated by dotted lines 20, whereby such parts become thoroughly massaged.

Having thus described my invention what I claim as new and desire to secure by Letters Patent, is:—

1. In a device of the described class, the combination of a horizontal bar, a pair of handles affixed to said bar, a pair of central members also affixed to near the center of said bar, said central members being each provided at its outer end with a roller bearing adapted, as said handles are moved, to traverse the head, neck and spine of the user.

2. In a device of the described class, the combination of a horizontal bar, a pair of handles affixed to said bar, a pair of central members also affixed to said bar, said central members being each provided at its outer end with a revoluble bearing, said bearing being adapted as said handles are moved to revolve as they traverse the head, neck and spine of the user.

3. In a device of the described class, the combination of a horizontal bar, a pair of handles affixed to said bar, a pair of central members also affixed to said bar, said central members being affixed at an angle, and each provided at its outer end with a roller adapted, as said handles are moved, to traverse the head, neck and spine of the user.

4. In a device of the described class, the combination of a horizontal bar, a downward V shaped projection connected with said horizontal bar, a pair of handles each provided at its outer end with a ball, a pair of central members also affixed to said bar, said central members being each provided at its outer end with a roller adapted as said handles are moved to traverse the head, neck and spine of the user.

5. In a device of the described class, the combination of a horizontal bar, a pair of handles each provided at its outer end with a ball, a non-metallic covering affixed to said handles, a pair of central members said central members being each provided at their outer ends with a roller adapted as said handles are moved to traverse the head, neck and spine of the user.

6. In a device of the described class, the combination of a horizontal bar, a pair of handles affixed to said bar, a pair of central members also affixed to said bar, said central members being each provided at its outer end with a revoluble bearing adapted, as said handles are moved, to revolve as it traverses the head, neck and spine of the user, a spiral spring interposed between said rollers, a sheet, a pair of cylindrical members connected with said sheet, the space between said cylindrical members being adapted to form a groove for the reception of said first named bar.

7. In a device of the described class, the combination of a horizontal bar, a pair of handles affixed to said bar, a pair of central members also affixed to said bar, said central members being each provided at its outer end with a revoluble bearing, a rod supported from the upper ends of said central members, a pair of rollers supported on said rod, and a spiral spring interposed between said rollers, also supported from said rod.

In testimony whereof I affix my signature in the presence of two witnesses.

HALBERT L. HOARD.

Witnesses:
S. R. JONES,
KARL A. BONNETT.